Feb. 7, 1939.　　　O. W. SCHWEIKLE　　　2,146,357
BRAKE CONDITION INDICATOR
Filed July 9, 1936　　　2 Sheets-Sheet 2
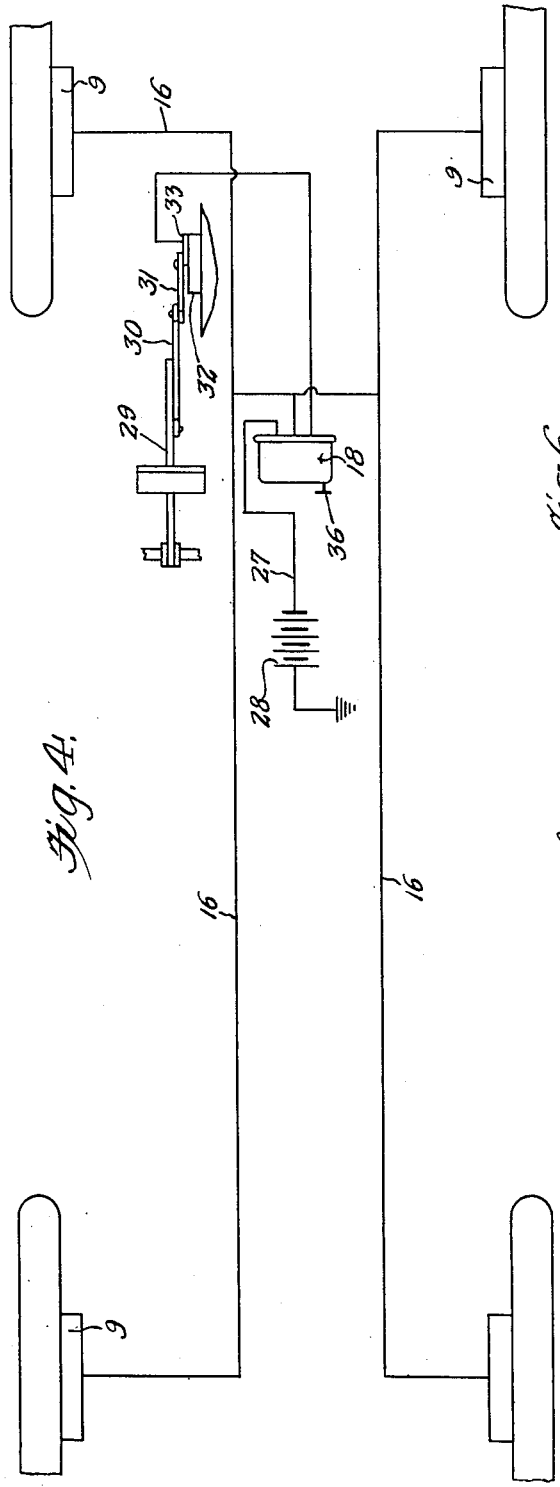
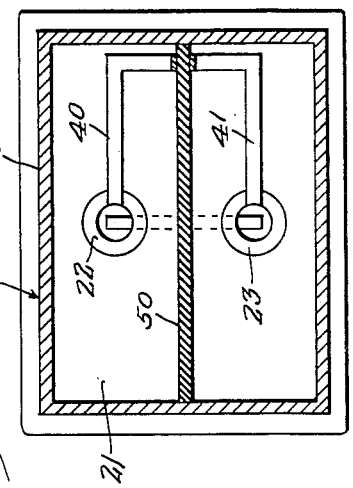
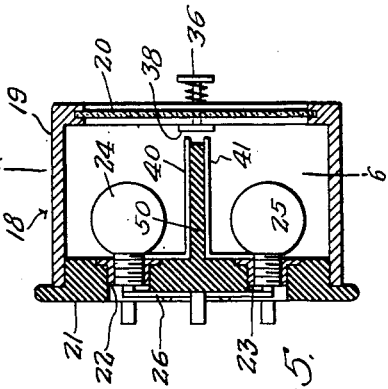
Inventor
Otto W. Schweikle,
By Clarence A. O'Brien,
Hyman Berman
Attorneys Patented Feb. 7, 1939

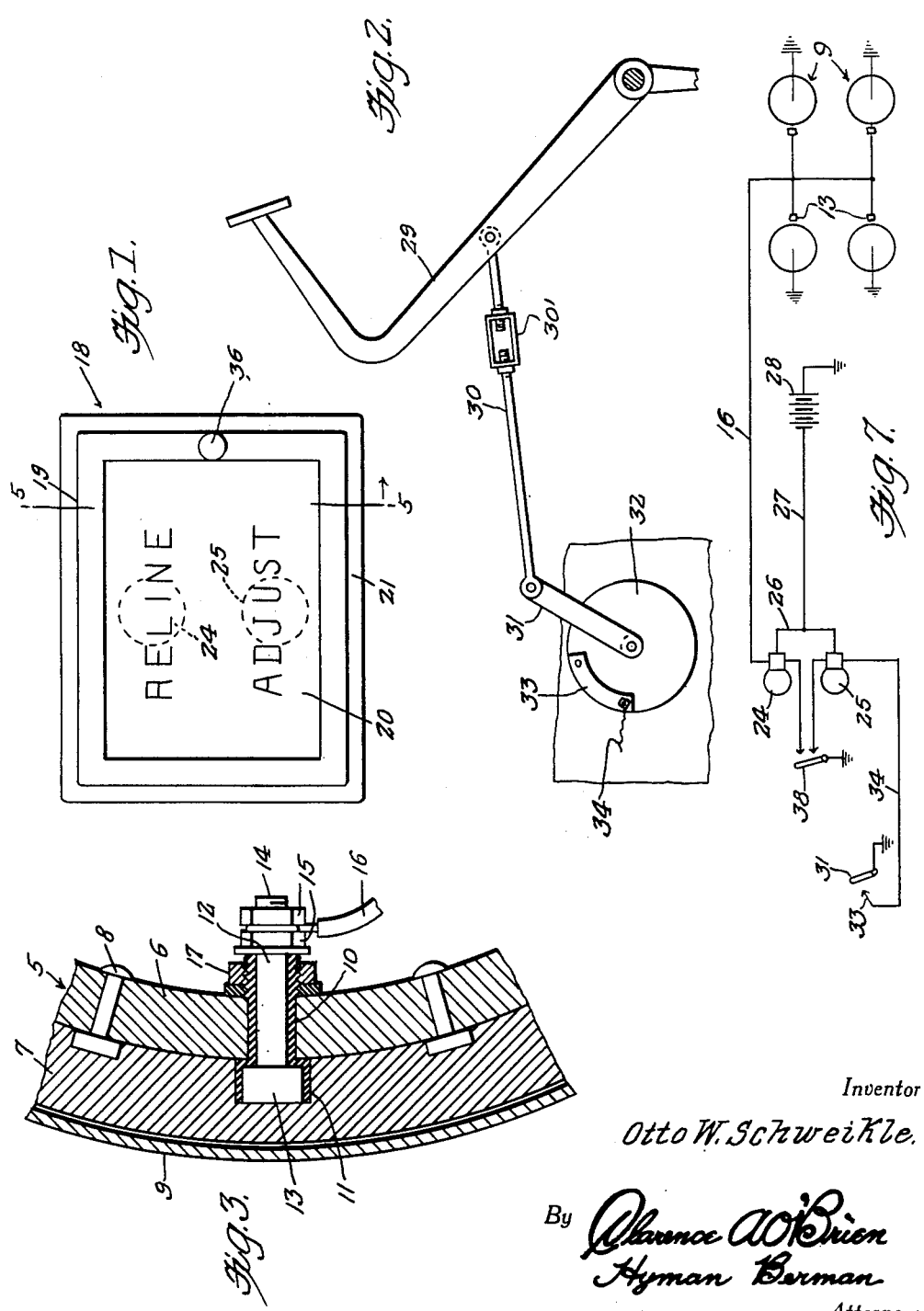

2,146,357

UNITED STATES PATENT OFFICE 2,146,357

BRAKE CONDITION INDICATOR

Otto W. Schweikle, Williamsport, Pa.

Application July 9, 1936, Serial No. 89,838

1 Claim. (Cl. 200—52)

This invention appertains to new and useful improvement in electric signalling, and more particularly to a novel indicator for indicating at all times the true condition of motor vehicle brakes.

The principal object of the present invention is to provide a simple and inexpensive mechanism for indicating the true condition of motor vehicle brakes at all times which in operation is substantially fool-proof.

Another important object of the invention is to provide an indicator for motor vehicle brakes which, because of its simplicity, can be installed at low cost.

These and various other important objects and advantages will become apparent to the reader of the following specification.

In the drawings:

Figure 1 represents a front elevational view of the indicator.

Figure 2 is a fragmentary side elevation of a pedal operated switch forming part of the system for indicating brake condition.

Figure 3 is a fragmentary vertical sectional view through the brake-equipped with the contact plug.

Figure 4 is a diagrammatic view disclosing the electrical connection between the electrical devices involved.

Figure 5 represents a vertical sectional view through the indicator on line 5—5 of Figure 1.

Figure 6 represents a vertical sectional view taken substantially on the line 6—6 of Figure 5, with the bulbs removed.

Figure 7 is a diagrammatic layout of the system.

Referring to the drawings wherein like numerals designate like parts, it can be seen in Figure 3 that numeral 5 generally refers to one of the brakes, the structure of which consists of the brake shoe 6 having the brake lining 7 secured thereon by suitable rivets 8. Numeral 9 designates the brake drum. In carrying out the present invention, the shoe 6 has an opening therein through which the tube 10 of insulation is disposed, the same widening out to form a socket 11 in the lining 7 terminating inwardly from the outer surface thereof. Numeral 12 represents a conducting rod extending through the insulating tube 10 and terminating in a contact head 13. The inner end of this contact rod 12 is screw-threaded as at 14 to accommodate the binding nut 15 between which the terminal of the wire 16 is clamped.

By referring to Figure 7, it can be seen that when the switch blade 31 is operated by the brake pedal 29 (see Figure 2), the bulb 25 will be energized to indicate when adjustment in the brakes is necessary. When no adjustment is necessary, the brake pedal 29 will not be depressed sufficiently far to result in the engagement of the contactor 31 with the contact strip 33.

In the event any one of the brake linings 7 wears down to such an extent that the corresponding contact member 13 engages the drum 9, current will flow from the battery 28 through the lamp 24 to the grounded drum 9, thus affording the driver an indication that his brakes require relining.

In order to test the lamps 24—25 to determine whether they are in operative order, the push-button switch 36 can be actuated so that the contact 38 thereof will bridge the strips 40—41. This contact 38 is grounded as shown in Figure 7 so that current will pass from the battery 28 through both lamps 24—25 to ground, thus affording the driver an instantaneous indication of the condition of the bulbs 24—25.

By referring to Figure 5, it can be seen that the indicating instrument has extending forwardly from the back wall 21 a partition 50 which terminates inwardly of the window 20 and has the contact strips 40—41 extending along opposite sides thereof so as to protrude at their free ends beyond the outer edge of the partition 50 and in the path of the contact 38.

While the foregoing specification sets forth the invention in specific terms, it is to be understood that numerous changes in shape, size, and materials may be resorted to without departing from the spirit and scope of the invention as claimed hereinafter.

Having described the invention, what is claimed as new is:

Vehicle brake mechanism comprising a brake drum mounted to rotate on the frame of the vehicle, a relatively non-rotating brake shoe mounted on said vehicle and provided with a friction lining, means for moving said shoe with its lining thereon into and out of braking contact with said drum, an electric contact rod mounted on and insulated from said shoe and extending radially through said shoe with its outer end at a predetermined distance inwardly from the outer face of said lining, the outer end of said rod being adapted to make electrical contact with said drum upon movement of the shoe toward said drum to an abnormal extent due to the wear of the friction lining through said predetermined distance, and an electrical indicating circuit connected to said drum and rod.

OTTO W. SCHWEIKLE.